United States Patent [19]
Braunlich, Jr. et al.

[11] 3,709,295
[45] Jan. 9, 1973

[54] FRACTURING OF SUBTERRANEAN FORMATIONS

[75] Inventors: Frank H. Braunlich, Jr., Tulsa; Milton L. Bishop, Edmond, both of Okla.

[73] Assignee: The Dow Chemical Company, Midland, Mich.

[22] Filed: June 24, 1971

[21] Appl. No.: 156,402

[52] U.S. Cl. ........................166/245, 166/271, 299/4
[51] Int. Cl. ............................................E21b 43/119
[58] Field of Search......166/271, 308, 259, 253, 250, 166/281, 280, 245; 299/4, 5

[56] References Cited

UNITED STATES PATENTS

| | | | |
|---|---|---|---|
| 3,199,586 | 8/1965 | Henderson | 166/271 X |
| 3,285,335 | 11/1966 | Reistle | 166/259 X |
| 3,501,201 | 3/1970 | Closmann | 299/4 |
| 3,537,529 | 11/1970 | Timmerman | 166/271 |

*Primary Examiner*—Robert L. Wolfe
*Attorney*—Bruce M. Kanuch et al.

[57] ABSTRACT

A method is provided for controlling the direction of fractures produced in a subterranean formation. In this method three wells drilled in a substantially straight line are simultaneously subjected to hydraulic fracturing. First, a fracturing fluid is continuously injected into the two outside wells and while continuing said introduction, fracturing fluid is then injected into the center well until fractures while lie in a plane which is crosswise to the line of the three wells are produced.

7 Claims, 3 Drawing Figures

PATENTED JAN 9 1973  3,709,295

INVENTORS.
Frank H. Braunlich, Jr.
Milton L. Bishop
BY Bruce M Kanuch
ATTORNEY

FRACTURING OF SUBTERRANEAN FORMATIONS

BACKGROUND OF THE INVENTION

In many petroleum producing formations there exist a series of natural (and/or man made), and sometimes parallel, oriented fractures. During hydraulic fracturing operations, the fracturing fluid tends to follow the line of least resistance, penetrating fractures which lie in natural occurring planes of weakness in the formation. Attempts to create fractures which are generally crosswise to the pre-existing fractures have not been completely successful because the newly created fractures will be parallel to the pre-existing fracture system. It is desirable to tie other pre-existing fractures into the wellbore to increase oil production and the like. For example, in the Marmaton formation located in Texas, oil is contained in a series of natural vertical oriented fractures. These fractures are parallel and run generally in an east-west direction. There are very few natural cross-fractures to tie the dominant fractures together. Thus, oil can only be produced from those vertical fractures which are directly tied into a wellbore. Little success has been achieved by conventional hydraulic fracturing methods. Methods for interconnecting boreholes have been developed but are not applicable to provide crosswise fractures. Such methods are taught, for example in U.S. Pat. Nos. 3,058,730 and 3,501,201.

SUMMARY OF THE INVENTION

In the practice of the present invention, the formation to be fractured is penetrated by at least three wellbores lying in a substantially straight line which is parallel to a line of pre-existing fractures and channels. A hydraulic fracturing treatment is first simultaneously started on the two outside wells. When the formation pressure has been substantially increased and hydraulic fractures are nearing the center well, a standard hydraulic fracturing treatment is then initiated in the center well and continued until the formation adjacent to the center well has been effectively fractured. By employing this method, the formation around the center well is fractured in a generally crosswise plane to the plane of the pre-existing fractures. This allows for more oil drainage into the wellbores. The method is especially suited for providing generally vertically displaced fractures adjacent to the center borehole. By crosswise it is meant in a direction different from the general line of the borehole line.

Center well means one located substantially on a line between the two outside wells but not necessarily equal distance from each outside well.

DETAILED DESCRIPTION OF THE INVENTION

Figure 2:
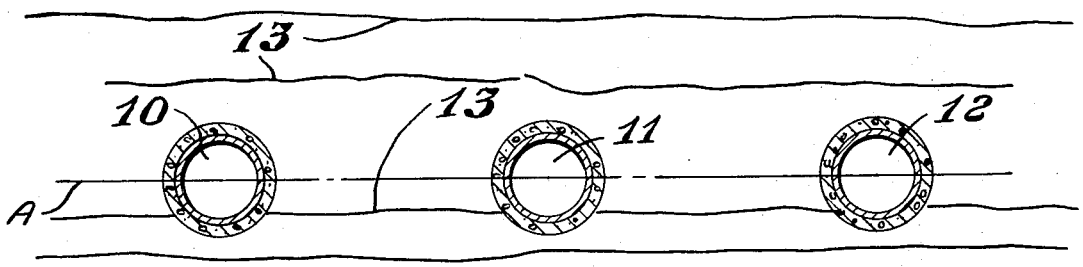
FIG. 2 is a plane view of the wells shown in FIG. 1 showing the general orientation of the pre-existing vertical fractures in the formation.
Figure 1:
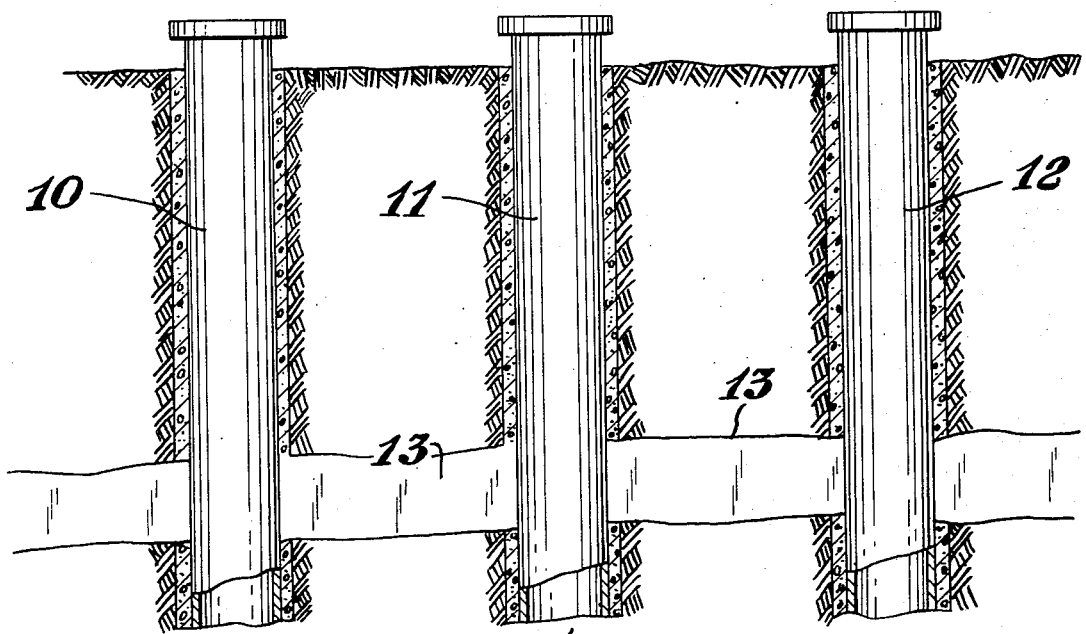
FIG. 1 shows a side elevation of three spaced apart wells which are in communication with several vertically oriented fractures existing in a subterranean formation.
Figure 3:
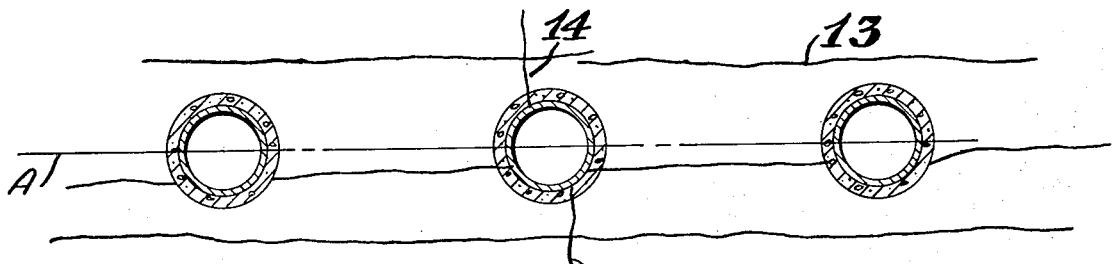
FIG. 3 is a plane view of the three wells of FIGS. 1 and 2 wherein communication between pre-existing vertical fractures has been established by practicing the principles of the present invention.

In the practice of the present invention (reference being made to the drawings) a standard hydraulic fracturing treatment is performed simultaneously on three wells, 10, 11 and 12, drilled in a line A which is substantially parallel to the plane of pre-existing fractures 13 within a formation to be fractured. Using standard fracturing fluids, particulate propping agents, pumping equipment and the like, standard fracturing treatments are first started on the outside wells 10 and 12. Because of the pre-existing fractures, the flow of fluid will generally follow the line A of the three wells with unusual stresses being applied to the formation adjacent to the center well 11. When the flow of fluid through the formation nears the center well, a standard fracturing treatment is then started on the center well 11. The fracturing treatment is continued until fractures 14 generally crosswise to the plane of the pre-existing fractures are created.

The wells may be spaced a substantial distance apart. The distance is only limited by the distance which a fracturing fluid may be introduced in the specific type of formation encountered. Distances of about 600 to 6000 feet are usually suitable.

Several variations employed in standard fracturing techniques known in the art can be employed in the practice of the present invention. Thus, the casing and/or formation in the center well may be notched or perforated in the direction where the newly created fractures are desired. The notching or perforation may be produced by any suitable means such as, for example, by the apparatus of U.S. Pat. No. 3,066,735 or by standardized perforating guns known in the art. Specific methods employing notching techniques are taught in U.S. Pat. Nos. 3,129,761 and 3,270,816. The teachings of these three patents are specifically incorporated herein by reference. These notching and perforating techniques and methods may also be performed in the outside wells to direct the fracturing fluid in the general direction of the center well.

Another technique which can be employed in conjunction with the present invention comprises plugging pre-existing fractures connecting with the wellbores, in the outside and/or center wells. In the outside wells pre-existing fractures connecting with the outside of the well, opposite to the center well, or in a crosswise direction are plugged in a manner known in the art. By employing this method, the fracturing fluid from the fracturing operation can be directed toward the center well. Methods and materials for successfully plugging such pre-existing fractures are taught, for example, in U.S. Pat. Nos. 3,419,070 and 3,028,914. The teachings of these patents are specifically incorporated herein by reference.

In another embodiment of the present invention, at least a portion of the fracturing fluid employed to initiate the pressure build-up from the two outside wells comprises a fluid which sets up to form a resilient plug. This plugging fluid is pumped down the two outside wells and through the formation in the direction of the center well. It is allowed to set up to form a strong resilient plug. After it sets up, pressure is maintained thereon from the outside wells and a hydraulic fracturing method is then performed on the center well. The plugging fluid may comprise any material which is initially pumpable and which later sets up to form a strong, permanent or removable, resilient plug. Included, for example, are aqueous solutions of gellable polymers including but not limited to natural gums, starches, cellulose derivatives, acrylamide polymers, which may contain cross-linking agents which may self-cross-link upon temperature change or the like. Specific plugging fluids include, for example, those taught and claimed in U.S. Pat. Nos. 3,306,870, 3,554,287 and 3,511,313, the teachings of which are specifically incorporated herein by reference.

Fracturing fluids which can be employed in the present invention are well known in the art. They are generally chosen from among many different types depending on the type of formation to be fractured, the type of various chemicals in the formation and the like. In general, fracturing fluids may be divided into the following broad classifications: (1) hydrocarbon gels; (2) aqueous gels (acid and/or water); (3) emulsions; (4) refined oil; (5) lease oil and (6) miscellaneous types of fluids.

Particulate solid materials known as propping agents can also be incorporated into the fracturing fluids to hold open fractures which are created during the treatment. Sand is the most commonly employed propping agent while others include particulate aluminum, particulate glass, walnut shells and other similar materials.

Equipment employed to perform the fracturing treatments are well known in the art, e.g., well head equipment, pumping equipment, mixing equipment and transporting equipment are all well known.

In the practice of the fracturing operation, the fracturing fluid is pumped into the well and the formation desired to be fractured, under elevated pressures. The zones which are desired to be fractured in the formation can be isolated by employing packers and other like equipment known in the art.

As an example of the operation of the present invention, reference is made to the Marmaton formation located in Ochiltree County, Texas and Beaver County, Oklahoma. Production wells in this formation are generally laid out in an east-west direction across the Marmaton formation. The series of naturally occurring vertical fractures generally lay in parallel planes that are oriented in the same general east-west direction. Oil drainage into the wells is from a narrow zone lying in the same east-west direction. This leaves a great amount of oil in place in those natural occurring fractures which are not tied into a well, or tied in with another fracture which is tied into a well. These wells have been hydraulically fractured in the past and it has been found during such fracturing treatments that the newly created fractures generally follow the same generally east-west plane. In fact, wells lying both east and west of the well being fractured often were breached by the fracturing fluid. The present wells are generally spaced about 5280 feet apart. In the past when these wells have been fractured nearly all the treated wells showed a rapid decline of production over that production immediately following the fracturing operation. A typically good well would begin by flowing from 300 to about 400 barrels of oil per day (BOPD). Within 6 months or so, in many instances, it was necessary to install a pump and the production rate would even then be only between about 120 to 150 BOPD. Other wells were so poor that they had to be put on a pump immediately after the fracturing treatment. In the practice of the present invention, standard fracturing techniques are begun on two outside wells having a third well on the same line located in between. The injection rate of the fracturing fluid is about 50 barrels per minute. After approximately 4000 barrels of fracturing fluid are injected down the outside wells, a fracturing treatment is then started on the center well also employing an injection rate of about 50 barrels per minute. The fracturing technique is continued until a new line of fractures is created in the formation adjacent the center well which are generally crosswise to the plane of the pre-existing fractures.

What is claimed is:

1. A method for fracturing subterranean formations which comprises:
   a. providing at least three wellbores situated along a substantially straight line which penetrate the formation desired to be fractured;
   b. simultaneously introducing a fracturing fluid into the two outside wells;
   c. continuing the introduction of said fracturing fluid until the fluid is near the center well;
   d. introducing a fracturing fluid into the third center well while maintaining said fracturing fluid in the two outside wells; and
   e. continuing the introduction of said fracturing fluid into said center well until said formation adjacent to the center well is fractured in a direction crosswise to the general line of the wells.

2. The method as defined in claim 1 wherein the line of the three wells is substantially along a line of pre-existing fractures which are substantially parallel.

3. The method as defined in claim 1 wherein fracturing fluid is continuously introduced into the outside wells while fracturing fluid is introduced into the center well.

4. The method as defined in claim 1 wherein pre-existing fractures connect with the two outside wells on the sides opposite to the center well, and said fractures are plugged thereby to divert said fracturing fluid toward said center well.

5. The method as defined in claim 1 wherein at least a portion of the initial fracturing fluid introduced into said outside wells consists of a fluid which sets to form a resilient plug in the formation between the center well and the two outside wells and maintaining the fracturing fluid on said plug while fracturing fluid is introduced into the center well.

6. In the method of fracturing subterranean formations comprising penetrating the formation with at least one wellbore and introducing a fracturing fluid under sufficient pressure to provide fractures therein, wherein said formation is characterized by containing a series of pre-existing fractures said fractures being substantially parallel to one another and lying along a pre-existing line and said formation is further characterized in that there is substantially no connection between said pre-existing fractures, the improvement which comprises:
   a. providing at least three wellbores which penetrate said formation, said wellbores being situated along a line substantially parallel to the line of the pre-existing fractures to provide at least two outside wells having one center well located in between;
b. simultaneously introducing said fracturing fluid under pressure into said two outside wells;
c. continuing the introduction of said fracturing fluid into said two outside wells until at least a pressure sufficient to fracture the formation is achieved;
d. introducing fracturing fluid under pressure into said center well while maintaining said fracturing pressure in the two outside wells; and
e. continuing the introduction of said fracturing fluid into said center well until fractures are produced in said formation which are crosswise to the line of the pre-existing fractures.

7. The method as defined in claim 6 wherein pre-existing fractures connect with the two outside wells on the sides opposite to the center well and said fractures are plugged so as to divert said fracturing fluid toward said center well.

* * * * *